(12) United States Patent
Gallardo et al.

(10) Patent No.: US 9,104,893 B2
(45) Date of Patent: Aug. 11, 2015

(54) RULE BASED ACCESS FOR REMOVABLE STORAGE

(71) Applicant: Microsoft Corporation, Redmond, WA (US)

(72) Inventors: John Gallardo, Woodinville, WA (US); Sean McKenna, Seattle, WA (US); Sudipta Dey, Bellevue, WA (US); Xiaoshan Wang, Redmond, WA (US); Akhilesh Kaza, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 13/784,632

(22) Filed: Mar. 4, 2013

(65) Prior Publication Data

US 2014/0250521 A1    Sep. 4, 2014

(51) Int. Cl.
*G06F 17/30* (2006.01)
*G06F 21/70* (2013.01)

(52) U.S. Cl.
CPC ...................................... *G06F 21/70* (2013.01)

(58) Field of Classification Search
None
See application file for complete search history.

(56) References Cited

U.S. PATENT DOCUMENTS

| 7,970,724 | B1 | 6/2011 | Hauser | |
|---|---|---|---|---|
| 8,261,345 | B2 | 9/2012 | Hitomi et al. | |
| 2006/0224742 | A1 | 10/2006 | Shahbazi | |
| 2010/0011351 | A1 | 1/2010 | Tsvi et al. | |
| 2010/0169394 | A1* | 7/2010 | Hahn | 707/828 |
| 2011/0271273 | A1 | 11/2011 | Dumais et al. | |
| 2012/0002951 | A1* | 1/2012 | Reisman | 386/278 |
| 2012/0036370 | A1* | 2/2012 | Lim et al. | 713/189 |
| 2012/0110345 | A1 | 5/2012 | Pigeon et al. | |
| 2012/0265792 | A1 | 10/2012 | Salters | |

OTHER PUBLICATIONS

"Accessing the Embedded Secure Element in Android 4.x", Retrieved on: Feb. 4, 2013, 5 pages. Available at: http://nelenkov.blogspot.in/2012/08/accessing-embedded-secure-element-in.html.
Bartel, et al., "Automatically Securing Permission-Based Software by Reducing the Attack Surface: An Application to Android," In Proceedings of the 27th IEEE/ACM International Conference on Automated Software Engineering, Sep. 3, 2012, 10 pages.

* cited by examiner

*Primary Examiner* — Brandon Hoffman
(74) *Attorney, Agent, or Firm* — John Jardine; Kate Drakos; Micky Minhas

(57) ABSTRACT

Various techniques and solutions are described for rule-based access to removable storage devices. For example, a request can be received to perform a file system operation using a removable storage device that is formatted with a file system that does not support access controls. A rules-based check of the received request can be performed by a service by checking the request against a plurality of rules. Based on results of the rules-based check, the request can be allowed or denied.

19 Claims, 8 Drawing Sheets

RULE BASED ACCESS FOR REMOVABLE STORAGE

BACKGROUND

Devices, such as mobile phones and tablets, often have limited internal memory for storing files. In order to compensate for the limited internal memory, such devices often provide for expanding the storage capacity of the device using external memory cards, such as Secure Digital (SD) memory cards. While external memory cards can significantly increase the storage capacity of the device, they can also be the source of security problems.

External memory cards can be formatted with a file system that does not support access restrictions. An example of such a file system is the File Allocation Table (FAT) file system. When using a file system that does not support access restrictions, it may be possible for an application running on a device, such as a mobile phone, to access files on the external memory card that are not intended to be accessed by the application, such as files written by a different application or files written by an operating system.

Therefore, there exists ample opportunity for improvement in technologies related to accessing external storage on computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for rule-based access to removable storage devices. For example, requests to perform file system operations can be received by a service. The service can perform a rules-based check by checking the requested file system operation against one or more rules. Based on results of the rules-based check, the file system operation can be allowed or denied.

For example, a method can be provided for rule-based access to removable storage devices. The method comprises receiving a request to perform a file system operation using a removable storage device, where the removable storage device is formatted with a file system that does not support access controls, performing a rules-based check of the received request, where the rules-based check comprises checking the received request against a plurality of rules, and where the rules-based check is performed independent of the file system of the removable storage device, determining whether to allow the request to perform the file system operation based on results of the rules-based check, and when the request to perform the file system operation is allowed, performing the file system operation. The method can be implemented by a service of a computing device.

As another example, a method can be provided for rule-based access to removable storage devices. The method comprises receiving, by a file broker service of a computing device from a third-party application running on the computing device, a request to perform a file system operation using a removable storage device, performing, by the file broker service of the computing device, a rules-based check of the received request, where the rules-based check comprises checking the received request against a plurality of rules, and where the rules-based check is performed independent of the file system of the removable storage device, and when the rules-based check indicates that the plurality of rules are satisfied, performing the file system operation.

As another example, a method can be provided for rule-based access to removable storage devices. The method comprises receiving, from a third-party application running on a computing device, a request to perform a file system operation using a removable storage device of the computing device, where the removable storage device is formatted with a file system that does not support access controls, and where the file system is a File Allocation Table (FAT) file system, performing a rules-based check of the received request, where the rules-based check comprises checking the received request against a plurality of rules, and where the rules-based check is performed independent of the file system of the removable storage device, determining whether to allow the request to perform the file system operation based on results of the rules-based check, and when the request to perform the file system operation is allowed, performing the file system operation. In some implementations, the method is performed by a file broker service of the computing device where the file broker service of the computing device runs within an operating system security context and the third-party application runs within an application security context.

As another example, computing devices comprising processing units, memory, and removable storage devices can be provided for performing operations described herein. For example, a mobile computing device, such as a phone or tablet, can include a service, such as a file broker service, for performing rules-based checks for controlling access by applications to removable storage devices.

As described herein, a variety of other features and advantages can be incorporated into the technologies as desired.

DETAILED DESCRIPTION

Example 1

Overview

Figure 1:
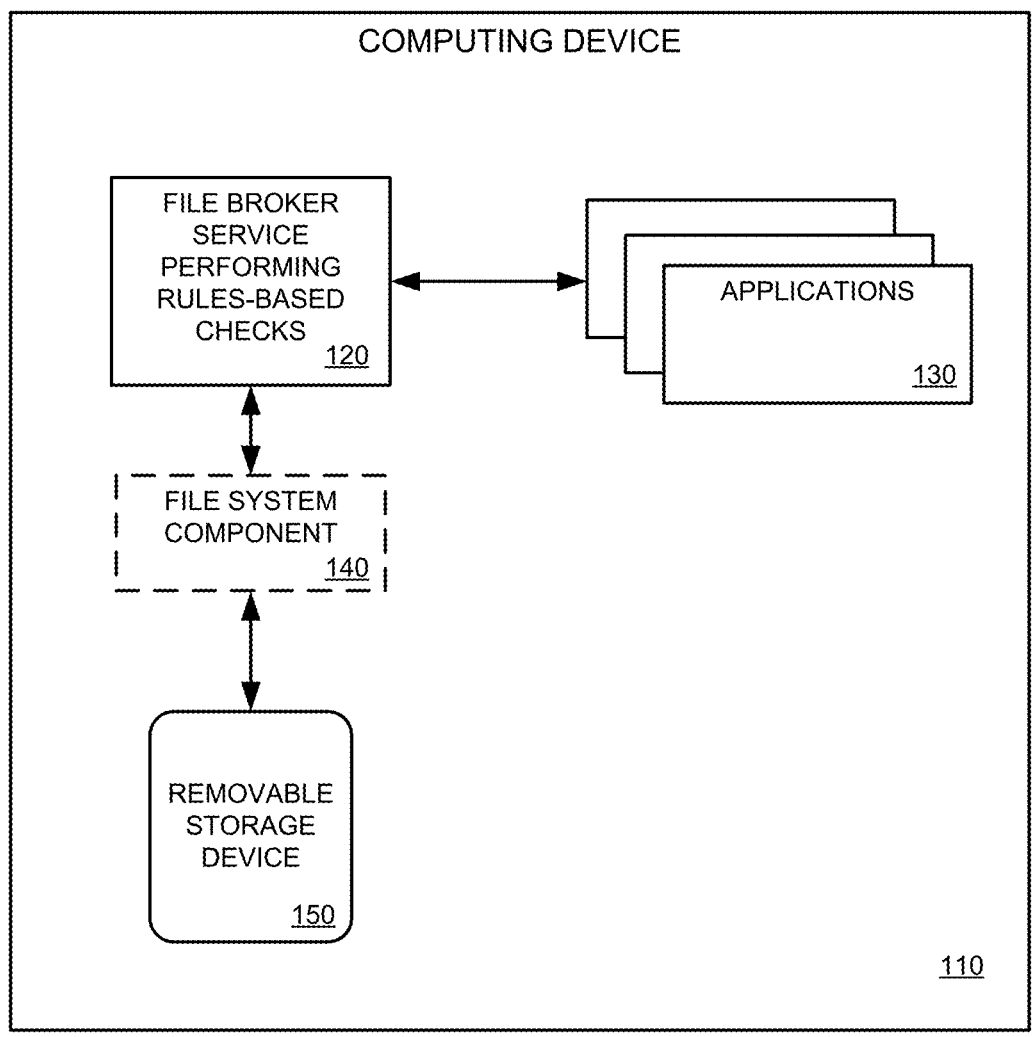
FIG. 1 is a block diagram depicting example elements of a computing device supporting rule-based access to removable storage devices.

As described herein, various techniques and solutions are applied for rule-based access to removable storage devices. For example, a service can be provided that applies rules-based checks for file system operations to access directories and/or files on a removable storage device formatted with a file system that does not support access controls. The file system operations can be received by the service from applications, such as third-party applications. The service, which can also be called a file broker service, can be any type of computing component (e.g., a software and/or hardware component, broker, module, driver, etc.) that is configured (e.g., programmed) to perform the rule-based checks described herein In some implementations, rules-based checks are performed by a file broker service. The file broker service receives requests to perform file system operations (e.g., directory enumeration operations, file enumeration operations, file read operations, file copy operations, etc.). The file system operations can be received from third-party applications. Third-party applications refer to applications, other than built-in applications, that are installed on the computing device (e.g., downloaded and installed from an online application store or from another source). The file broker service performs rules-based checks to determine whether to allow the file system operations.

In some implementations, the file broker service resides within a secure context provided by an operating system of a computing device (e.g., and operating system security context). Because the file broker service resides within the secure context, the file broker service has access to operating system components (e.g., file system drivers and other components) that allow the file broker service to access removable storage devices (e.g., SD cards). In a specific implementation, the file broker service is a trusted service that runs within a non-kernel mode trusted security context.

By providing a service (e.g., a file broker service) that controls access to a removable storage device formatted with a file system that does not support access controls, security and privacy can be maintained. For example, the service can perform rules-based checks of incoming requests to determine whether to allow or deny the requests.

For example, computing device (e.g., a phone or tablet) can support the installation of third-party applications (e.g., purchased from an application store). The computing device can also support removable storage devices (e.g., SD cards). In some situations, storage of the computing device can be extended to the removable storage device. For example, the removable storage device can be used to store files such as digital photos, movies, music, etc. In order to provide privacy and security for the files stored on the removable storage device, the computing device can control access by performing rules-based checks of file system operations. For example, third-party applications can be required to go through the service in order to access files stored on the removable storage device.

As a specific example, a user of a mobile computing device, such as a phone or tablet, can extend the internal storage of the device by inserting a removable storage device (e.g., a microSD card). In some implementations, the device requests authorization from the user before extending storage to the inserted removable storage device. The user can then store files on the removable storage device (e.g., digital pictures or movies taken with the device's camera, music files purchased from an online store, electronic book files purchased from an online store, files copied to the removable storage device, etc.). To maintain security and/or privacy of the files stored on the removable storage device, the computing device (e.g., by way of the operating system running on the computing device) can limit access to the files stored on the removable storage device (e.g., limit access to the files by third-party applications installed on the computing device). For example, the user can download third-party applications (e.g., from an application store), such as an electronic book (e-book) reader application. The user may have e-book files stored on the removable storage device (e.g., purchased and downloaded from an online store). When the e-book reader application wants to access files on the removable storage device, the e-book reader can send a request to a service (e.g., a file broker service) to access the files. The service can perform a rules-based check of the request and allow, or deny, the request. For example, the request can be allowed if the e-book reader application is accessing an e-book file of a registered file type (e.g., of a file type for which the e-book reader application has registered). As another example, the request can be denied if the e-book reader application is accessing a file of a non-registered file type (e.g., a picture file type, such as a .jpg file) or is accessing a system directory (e.g., a \pictures or \music directory).

In some implementations, the service (e.g., file broker service) supports one or more of the following techniques. The service stores per-application cursor states that maintains the directory and/or file currently being enumerated by the application. The service duplicates opened file handles and provides the copy of the file handle to the application for direct access by the application to the file (e.g., via standard file system APIs). The service canonicalizes paths prior to performing rules-based checks (e.g., as a security measure to prevent redirection to a system directory).

Example 2

Removable Storage Devices

In any of the examples herein, rule-based access can be applied to removable storage devices. Removable storage devices are storage devices that are typically not built-in to the computing device (e.g., that are connected, or plugged in, to the computing device via a slot or external connector). Removable storage devices can also be called external storage. Examples of removable storage devices include Secure Digital (SD) cards (e.g., standard SD cards, miniSD cards, microSD cards, etc.), MultiMediaCard (MMC) storage cards, Universal Serial Bus (USB) flash drives, etc.

For example, a computing device such as a tablet computer or phone typically has an amount of built-in internal memory. The built-in internal memory of the computing device is used to store software (e.g., operating system software, built-in applications, etc.) and data. Some computing devices provide for expanding the internal built-in memory via a slot or connector. For example, a computing device may provide an SD card slot which can accept an SD memory card (e.g., an SD memory card of a particular size, such as a microSD card).

Removable storage devices are typically formatted with a file system that does not support access controls (e.g., does not support access control lists (ACLs)). For example, many removable storage devices are formatted with the File Allocation Table (FAT) file system (e.g., FAT16 or FAT32). By formatting removable storage devices with a file system that does not support access controls, such as the FAT file system, the removable storage devices can be more easily transferred between different types of computing devices that may be running different operating systems.

Files related to, or used by, the operating system and/or built-in applications of the computing device can be stored on the removable storage device. For example, a built-in camera application can store digital photos on a removable storage device, or a built-in music application can store downloaded song files on the removable storage device. Before extending storage to a removable storage device, user notification and consent can be required.

Example 3

Rules-Based Checks

In any of the examples herein, rule-based access can be applied to removable storage devices by performing rules-based checks of file system operations. For example, rules-based checks can be performed by a service (e.g., a file broker service) to determine whether to allow, or deny, requests from applications (e.g., third-party applications) to perform file system operations.

Rules-based checks are performed by checking requests to perform file system operations against one or more rules. When performing a rules-based check, one or more of the rules described in this section can be applied separately or in combination. In some implementations, only third-party applications (and not built-in applications or operating system components) are subject to rules-based checks by a service before accessing a removable storage device.

One or more rules can be applied that require requests to perform file system operations be received from applications by a service (e.g., a file broker service). According to these rules, requests that are not received via the service (e.g., that try to access the file system directly) are denied.

One or more rules can be applied that validate the file system path (directory) being accessed by the file system operation. For example, these rules can prevent access to one or more system directories. The system directories can include, for example, a photos directory, a movies directory, a music directory, etc. For example, if an application tries to access a system photos directory (e.g., \Photos), then the request can be denied.

One or more rules can be applied that validate file types being accessed by the file system operations. For example, applications can be required to register the file types they want to access. These rules can then validate that the application is accessing a file type that it is registered for (e.g., that an application registered to access portable document format (PDF) file types is accessing a file with a ".pdf" extension). These rules can also be applied to filter files in a directory such that only files of a type that have been registered by the requesting application are returned (e.g., for a file enumeration operation). The file types that an application wishes to register can be provided by the application as part of an application manifest (e.g., an XML file associated with the application).

One or more rules can be applied that allow traversal of directory hierarchies which are not in restricted system locations. For example, an application can traverse directories that are not in a set of system directories (e.g., a set of pre-defined system directories, such as \Photos, \Videos, and \Music) to view files and/or subdirectories (e.g., if allowed by other rules). For example, an application may traverse a directory such as \mypdfs to access subdirectories (e.g., \mypdfs\documents\) and/or files (e.g., \mypdfs\report.pdf) within that directory (e.g., if the application is allowed to do so based on one or more other rules).

One or more rules can be applied that only allow access to files and directories stored on a removable storage device. For example, requests to access files and directories stored on internal storage can be denied.

One or more rules can be applied that deny access to system-controlled file types. For example, applications may not be allowed to directly access digital photo files stored on a removable storage device (e.g., JPEG file types).

Example 4

Application Manifest

In any of the examples herein, an application can be associated with an application manifest. For example, the manifest can be part of the application package (e.g., as downloaded from an application store). The application manifest can be provided, for example, as an XML file associated with the application. The application manifest defines various properties of the application.

In some implementations, the application manifest defines file types that the application wants to be able to access on the removable storage device. For example, a particular application that wants to access PDF files and e-book files could list PDF file types (e.g., by specifying one or more PDF file extensions, such as .pdf) and e-book file types (e.g., by specifying one or more e-book file extensions, such as .epub).

In some implementations, the application manifest defines one or more security capabilities of the application. For example, the security capabilities can include a capability of the application to access files stored on removable storage devices.

Manifest information for applications can be stored in a central repository (e.g., an application manifest repository). For example, when an application is installed (e.g., downloaded from an online application store), its manifest information can be copied and stored in an application manifest repository (e.g., copied and stored by an operating system component).

Example 5

Environment for Rule-Based Access to Removable Storage Devices

In any of the examples herein, a computing device, such as a mobile phone, tablet, or other type of computing device, can support rule-based access to removable storage devices. For example, a service, such as a file broker service, can support rules-based checking of requests to perform file system operations (e.g., requests received from third-party applications).

FIG. 1 is a block diagram depicting example elements of a computing device 110 supporting rule-based access to removable storage devices. The computing device 110 can be any type of computing device (e.g., desktop computer, server computer, laptop computer, notebook computer, tablet computer, mobile phone, smart phone, multimedia device, personal digital assistant (PDA), etc.). In some implementations, the computing device 110 is a phone or tablet computer that uses a user-accessible removable storage device (e.g., an SD card or MMC card) as additional file storage (e.g., to expand a limited amount of internal storage).

The computing device 110 comprises a file broker service 120 that performs rules-based checks of file system operations received from applications 130 (e.g., third-party applications). For example, the file broker service 120 can receive requests to perform file system operations using the removable storage device 150, where the removable storage device 150 is formatted with a file system that does not support access controls (e.g., a microSD card formatted with the FAT file system). The file broker service 120 can perform rules-based checks on the received file system operations to determine whether to allow the file system operations.

The file broker service 120 performs rules-based checks independent of the file system of the removable storage device 150. In this way, the file broker service 120 can provide security that may not be available from the file system of the removable storage device 150. Alternatively, the file broker service 120 can provide security in addition to, or different from, the security features available from the file system of the removable storage device 150.

In some implementations, the file broker service 120 communicates with the removable storage device 150 via a file system component 140. For example, the file system component 140 can be a file system driver of an operating system (e.g., a FAT file system driver) and/or other file system or operating system components (e.g., operating system components, such as security or permissions components).

For example, the file broker service 120 can receive a request from one of the applications 130 to perform a file system operation using the removable storage device 150. The request can be, for example, a request to perform a directory enumeration operation, a request to perform a file enumeration operation, a request to perform a file read or copy operation, or a request to perform another type of file system operation. In response to receiving the request to perform the file system operation, the file broker service 120 performs a rules-based check of the request. Performing the rules-based check comprises checking the request against a plurality of rules (e.g., rules preventing access to system directories, rules limiting access to only registered file extensions, etc.). The rules-based check is performed independent of the file system of the removable storage device 150 and therefore can provide security when the removable storage device 150 is formatted with a file system that does not support access controls. The file-broker service 120 determines whether to allow the request to perform the file system operation based on results of the rules-based check. For example, if all of the rules are satisfied (a result indicating the file system operation should be allowed), the request can be allowed. Conversely, if any of the rules are not satisfied (a result indicating the file system operation should be denied), the request can be denied. If the request to perform the file system operation is allowed, then the file broker service 120 can perform the file system operation (e.g., via the file system component 140) using the removable storage device 150. The file broker service 120 can return results of performing the file system operation to the application (e.g., the file broker service 120 can return a handle to an enumeration cursor or a file access token).

Figure 2:
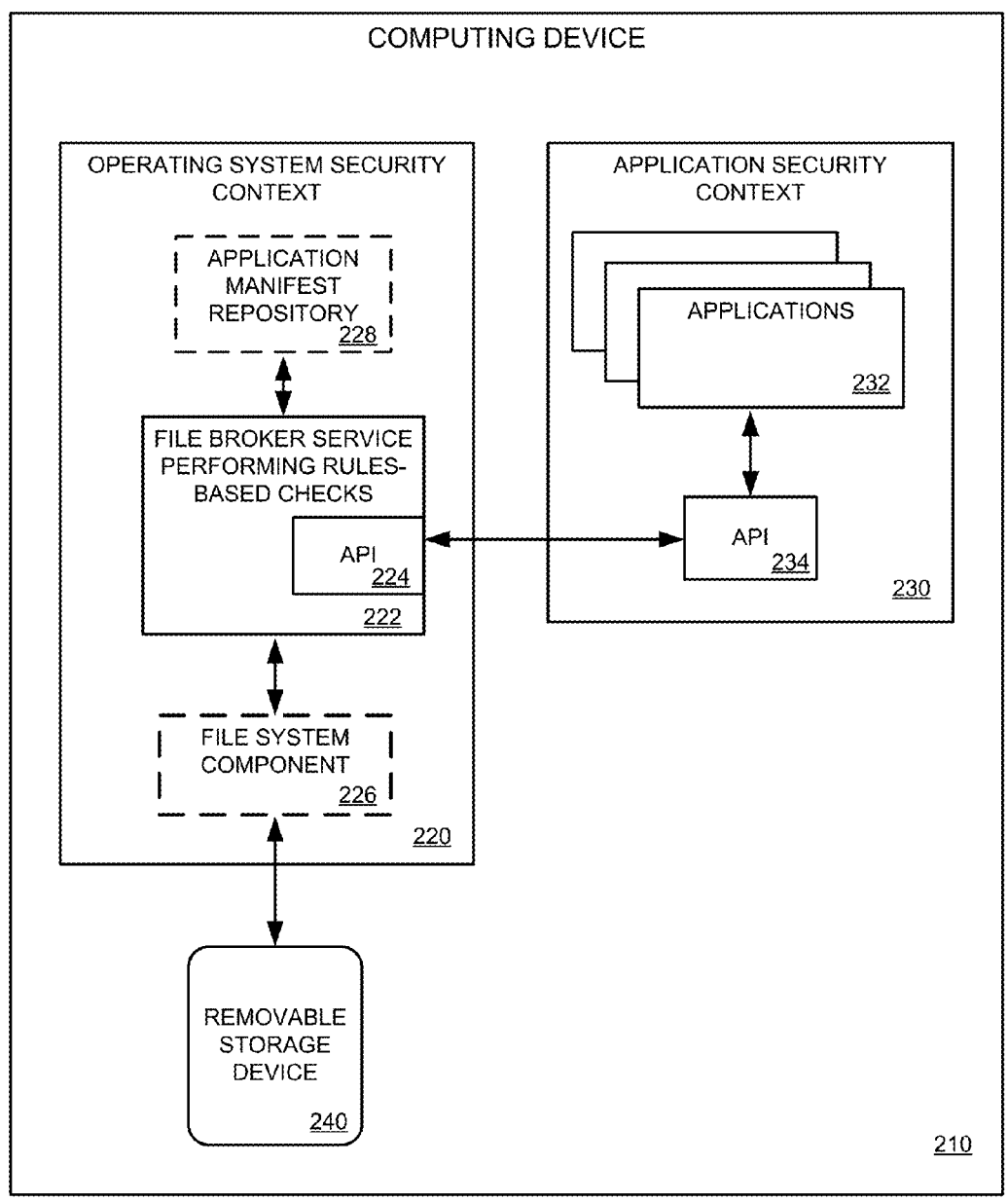
FIG. 2 is another block diagram depicting example elements of a computing device supporting rule-based access to removable storage devices.

FIG. 2 is a block diagram depicting example elements of a computing device 210 supporting rule-based access to removable storage devices. The computing device 210 can be any type of computing device (e.g., desktop computer, server computer, laptop computer, notebook computer, tablet computer, mobile phone, smart phone, multimedia device, personal digital assistant (PDA), etc.). In some implementations, the computing device 210 is a mobile phone or tablet computer that uses a user-accessible removable storage device (e.g., an SD card or MMC card) as additional file storage (e.g., to expand a limited amount of internal storage).

The computing device 210 supports components operating within an operating system security context 220 and other components operating within an application security context 230. The operating system security context 220 provides a secure context for accessing files and/or for performing other operations where security or privacy may be a concern. For example, operating system (and related) components (e.g., trusted components) can operate within the operating system context 220 and be provided with access (e.g., direct access) to operating system resources. As depicted, the operating system context 220 includes components such as a file broker service 222. For example, by requiring that file access be performed by components within the operating system security context 220, the computing device 210 can control access to sensitive or private information stored by the computing device.

The application security context 230 provides a context within which applications 232 (e.g., third-party applications) operate. For example, the application security context 230 can be an untrusted (or less trusted) security context for running third-party applications that are downloaded from an external source (e.g., from an application store). The application security context 230 can provide a context within which to run these applications in a segregated environment without direct access to system components and resources (e.g., file system components and file storage devices). By providing the application security context 230, access by the applications 232 to operating system resources (or other sensitive or private resources) can be controlled. For example, application programming interfaces (APIs) can be provided for controlling access by the applications 232 to system resources.

The computing device 210 comprises a file broker service 222, operating within the operating system security context 220, that performs rules-based checks of file system operations received from applications 232 (e.g., third-party applications), operating within the application security context 230. For example, the file broker service 222 can receive requests to perform file system operations using the removable storage device 240, where the removable storage device 240 is formatted with a file system that does not support access controls (e.g., a microSD card formatted with the FAT file system). The file broker service 222 can perform rules-based checks on the received file system operations to determine whether to allow the file system operations.

The file broker service 222 depicted in FIG. 2 is associated with an API 224 that communicates with a corresponding API 234 operating within the application security context 230. The API 224 associated with the file broker service 222, and that operates within the operating system security context 220, can be called the service-side API. The API 234 operating within the application security context 230 can be called the application-side API. In an alternative implementation, the file broker service 222 communicates directly with the application-side API 234.

In some implementations, the service-side API 224 is implemented in a trusted operating system service. In a specific implementation, the API is implemented as a Distributed Component Object Model (DCOM) based API with a service-side trusted portion (e.g., API 224) and an application-side untrusted portion (e.g., API 234).

The file broker service 222 performs rules-based checks independent of the file system of the removable storage device 240. In this way, the file broker service 222 can provide security that may not be available from the file system of the removable storage device 240. Alternatively, the file broker service 222 can provide security in addition to, or different from, the security features available from the file system of the removable storage device 240.

In some implementations, the file broker service 222 communicates with the removable storage device 240 via a file system component 226. For example, the file system component 226 can be a file system driver of an operating system (e.g., a FAT file system driver) and/or other file system or operating system components (e.g., operating system components, such as security or permissions components).

The file broker service 222 receives requests to perform file system operations from applications 232. The applications 232 communicate with the file broker service 222 via the application-side API 234 (i.e., the application-side API 234 is independent of the applications 232 and is accessible to any number of applications operating within the application security context 230). By providing a separate application-side API 234 that operates within the application security context 230, security can be maintained (e.g., the applications 232 may not be permitted to communicate directly with the file broker service 222 or other components operating within the operating system security context 220).

For example, the file broker service 222 can receive a request from one of the applications 232 to perform a file system operation using the removable storage device 240. The request can be, for example, a request to perform a directory enumeration operation, a request to perform a file enumeration operation, a request to perform a file read or copy operation, or a request to perform another type of file system operation. The request is received by the file broker service 222 via the service-side API 224 from the application-side API 234. In response to receiving the request to perform the file system operation, the file broker service 222 performs a rules-based check of the request. Performing the rules-based check comprises checking the request against a plurality of rules (e.g., rules preventing access to system or protected directories, rules limiting access to only registered file extensions, etc.). The rules-based check is performed independent of the file system of the removable storage device 240 and therefore can provide security when the removable storage device 240 is formatted with a file system that does not support access controls. The file-broker service 222 determines whether to allow the request to perform the file system operation based on results of the rules-based check. For example, if all of the rules are satisfied (a result indicating the file system operation should be allowed), the request can be allowed. Conversely, if any of the rules are not satisfied (a result indicating the file system operation should be denied), the request can be denied. If the request to perform the file system operation is allowed, then the file broker service 222 can perform the file system operation (e.g., via the file system component 226) using the removable storage device 240. The file broker service 222 can return results of performing the file system operation to the application (e.g., the file broker service 222 can return a handle to an enumeration cursor or a file access token).

In some implementations, the computing device 210 also comprises an application manifest repository 228. The application manifest repository stores manifest information for applications 232. The manifest information can include the file types that have been registered for each of the applications 232 as well as other manifest information (e.g., security capabilities declared by the applications 232). When performing a rules-based check, the file broker service 222 can check the request against the registered file types for the requesting application from the application manifest repository 228. The registered file types can be used by the file broker service 222 to control access and/or filter enumeration requests.

Example 6

Methods for Rule-Based Access to Removable Storage Devices

In any of the examples herein, methods can be provided for performing operations for rule-based access to removable storage devices. For example, methods can be performed by a service (e.g., a file broker service) for receiving requests (e.g., from third-party applications) to perform file system operations using removable storage devices. The service can perform rules-based checks to determine whether to allow or deny the requests. The service can perform the file system operations when allowed and provide results to requesting applications.

Figure 3:
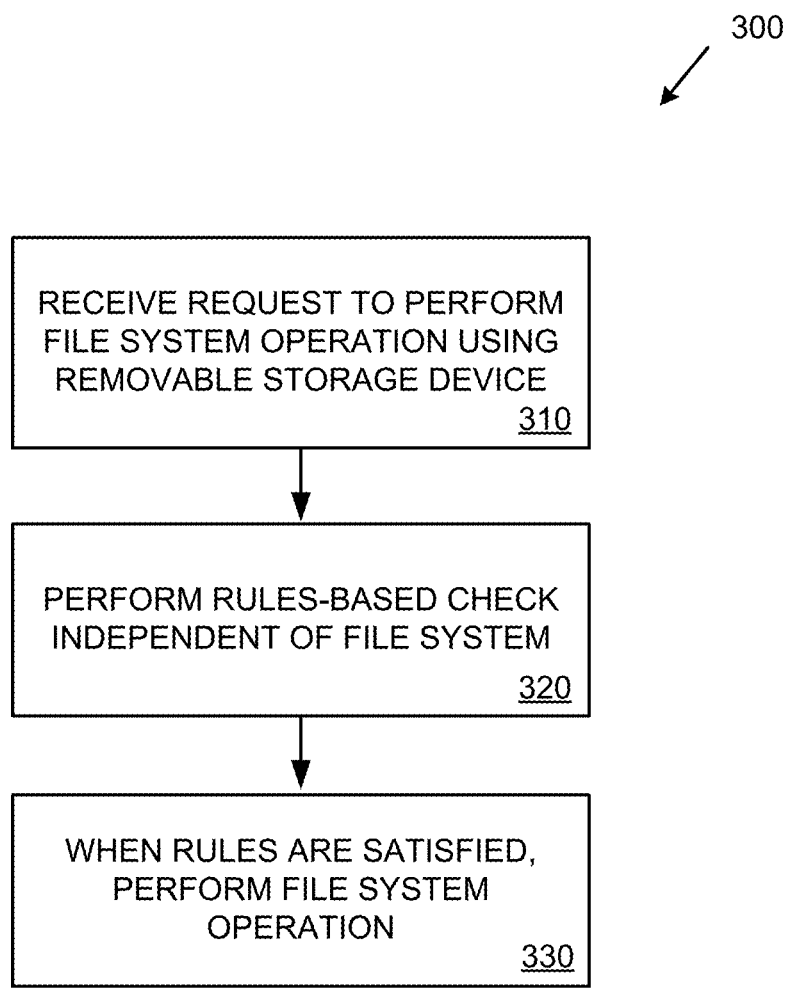
FIG. 3 is a flowchart of an example method for rule-based access to removable storage devices.

FIG. 3 is a flowchart of an example method 300 for rule-based access to removable storage devices. The example method 300 can be performed, for example, by the file broker service 120 or 222. At 310, a request is received to perform a file system operation using a removable storage device. In some implementations, the removable storage device is formatted with a file system that does not support access controls. The file system operation can be, for example, a directory enumeration operation, a file enumeration operation, a file access operation (e.g., a file read or copy operation), or another type of file system operation.

At 320, a rules-based check is performed for the received request. For example, performing the rules-based check can comprise checking the received request against a plurality of rules. The rules-based check is performed independent of the file system of the removable storage device (e.g., independent of security, permissions, or other access controls, if any, supported by the file system). In some implementations, if all of the plurality of rules are satisfied, then the request is allowed, and if any of the plurality of rules are not satisfied, then the request is denied.

At 330, when the rules-based check indicates that the plurality of rules are satisfied, the file system operation is performed. For example, if the file system operation is a directory enumeration operation, then performing the file system operation can comprise performing the directory enumeration operation and receiving a list of sub-directories in response. After the file system operation is performed, results can be returned (e.g., to a third-party application).

In some implementations, the request to perform the file system operation is received 310 by a service using a service-side API from a third-party application via an application-side API. The service can be operating within an operating system security context and the third-party application can be operating within an application security context.

Figure 4:
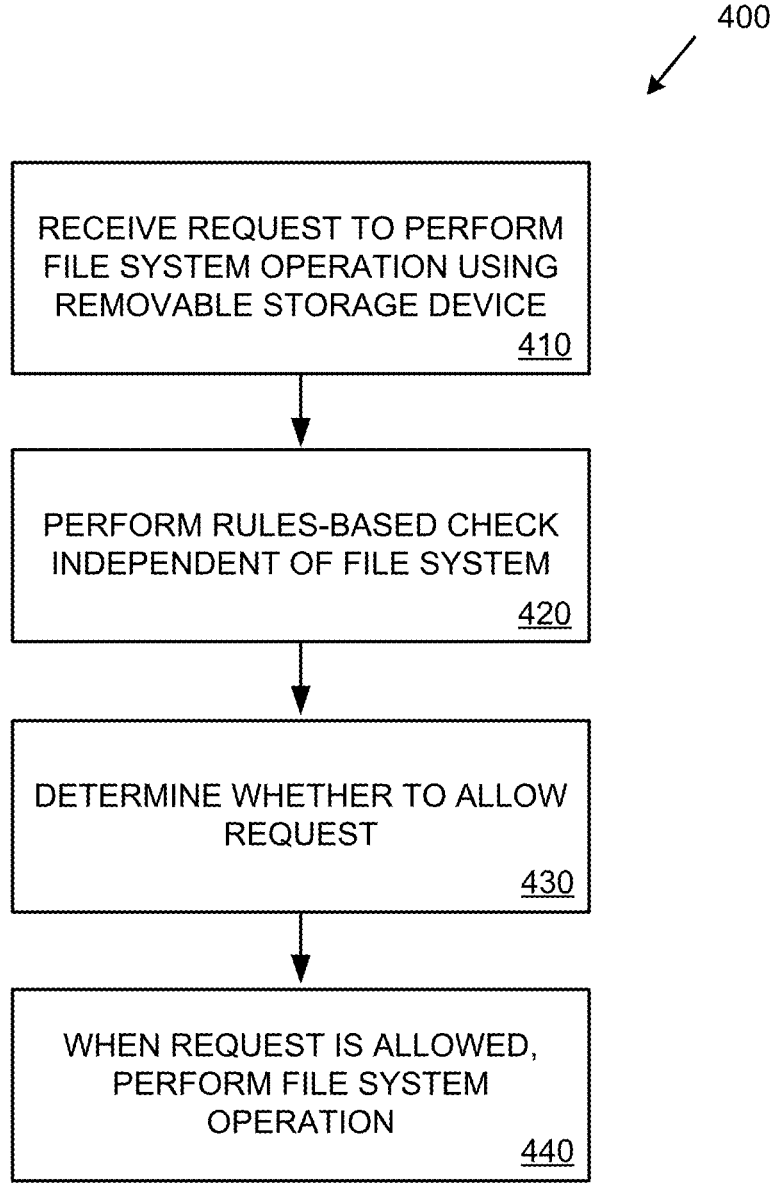
FIG. 4 is a flowchart of another example method for rule-based access to removable storage devices.

FIG. 4 is a flowchart of an example method 400 for rule-based access to removable storage devices. The example method 400 can be performed, for example, by the file broker service 120 or 222. At 410, a request is received to perform a file system operation using a removable storage device. In some implementations, the removable storage device is formatted with a file system that does not support access controls. The file system operation can be, for example, a directory enumeration operation, a file enumeration operation, a file access operation (e.g., a file read or copy operation), or another type of file system operation.

At 420, a rules-based check is performed for the received request. For example, performing the rules-based check can comprise checking the received request against a plurality of rules. The rules-based check is performed independent of the file system of the removable storage device (e.g., independent of security, permissions, or other access controls, if any, supported by the file system).

At 430, a determination is made whether to allow the request. In some implementations, if all of the plurality of rules are satisfied, then the request is allowed, and if any of the plurality of rules are not satisfied, then the request is denied.

At 440, when the request is allowed (as indicated by the determination 430), the file system operation is performed.

For example, if the file system operation is a file enumeration operation, then performing the file system operation can comprise performing the file enumeration operation and receiving a list of files in response. After the file system operation is performed, results can be returned (e.g., to a third-party application).

In some implementations, the request to perform the file system operation is received 410 by a service using a service-side API from a third-party application via an application-side API. The service can be operating with an operating system security context and the third-party application can be operating within an application security context.

Figure 5:
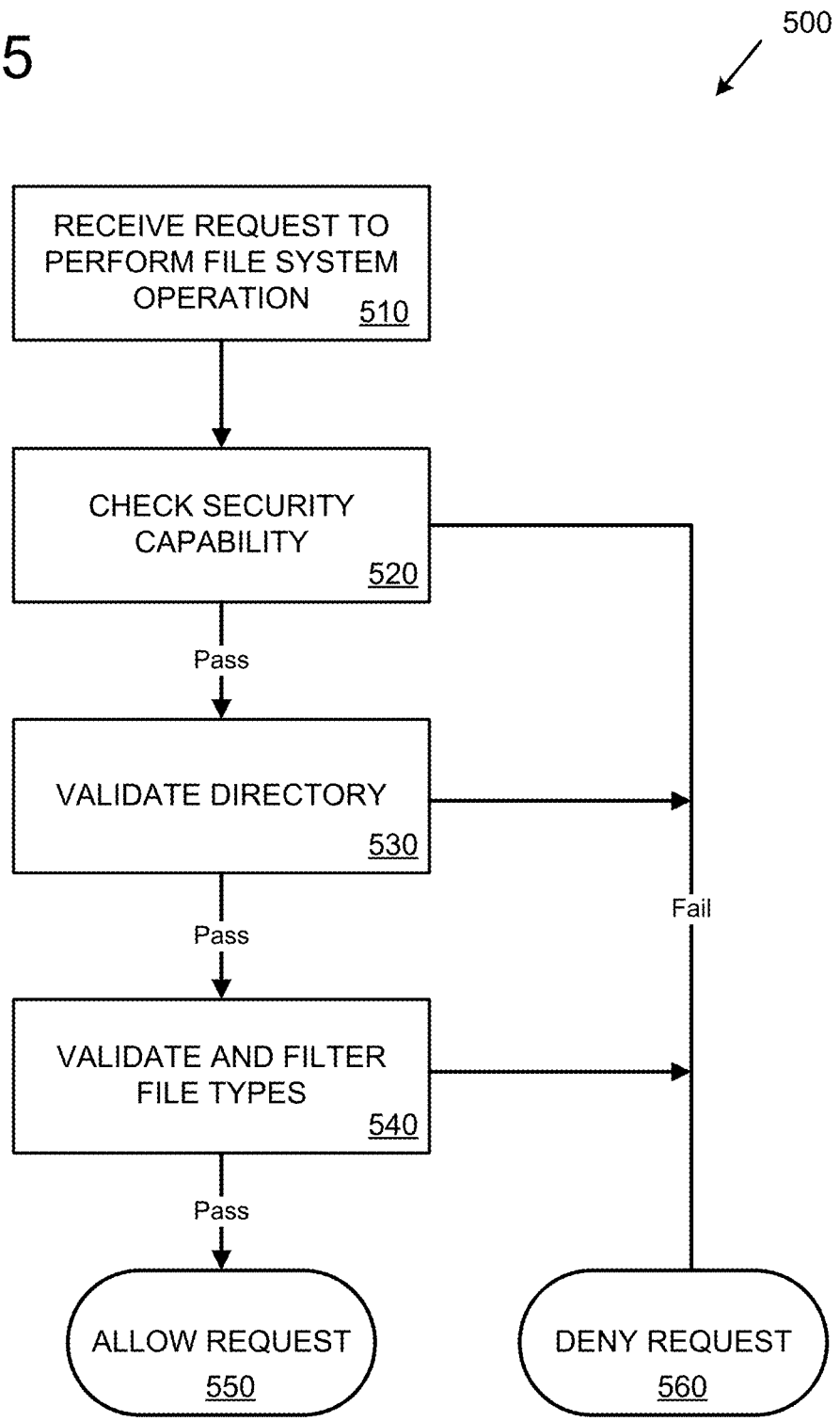
FIG. 5 is a flowchart depicting an example procedure for performing a rules-based check using a plurality of rules.

FIG. 5 is a flowchart depicting an example procedure 500 for performing a rules-based check using a plurality of rules. The example procedure 500 is performed by a file broker service (e.g., 120 or 222). At 510, a request to perform a file system operation is received by the file broker service from a third-party application. For example, the request can be received via an API comprising a service-side API and an application-side API.

At 520, the file broker service performs a rules-based check to check a security capability of the third-party application. The security capability indicates whether the third-party application has declared that it will have the capability of accessing files on a removable storage device. For example, the file broker service can retrieve the security capability information from an application manifest, directly from the third-party application, or from another source. If the security capability check passes, the procedure continues to 530.

At 530, the file broker service performs a rules-based check to validate a directory being accessed for the requested file system operation. The rules-based check can check whether the directory is within a list of system directories that are not accessible to third-party applications. This rules-based check can be performed, for example, during a directory enumeration operation, a file enumeration operation, and/or a file access operation. If the directory validation check passes, the procedure continues to 540.

At 540, the file broker service performs a rules-based check to validate and/or filter file types. The rules-based check can validate a file type being accessed by the third-party application. For example, the file type can be checked against one or more file types registered by the third-party application (e.g., as stored in an application manifest repository). The rules-based check can also filter file types. For example, if the third-party application is performing a file enumeration operation, the file information returned (e.g., file names and other meta-data) can be filtered to include only files of file types for which the third-party application has registered.

If all of the checks (520, 530, and 540) pass, then the request to perform the file system operation is allowed 550. However, if any of the checks fail, then the request to perform the file system operation is denied 560.

The example procedure 500 depicts rules-based checks that are performed in a specific implementation. In other implementations, greater, fewer, and/or different checks can be performed to determine whether to allow the request to perform the file system operation. In addition, each check can be performed using one or more rules, which may be different from those described above with regard to example checks 520, 530, and 540.

Example 7

Modes of Operation

In any of the examples herein, various modes of operation can be applied for rule-based access to removable storage devices. For example, a file enumeration mode of operation can be performed when a third-party application running on a computing device wants to display a list of all the PDF files in a directory on a removable storage device to a user of the computing device. The example modes below are described as being performed by a file broker service (e.g., 120 or 222). However, any type of component or service (e.g., an operating system service or another type of service) can perform checks according to the example modes.

A directory enumeration mode can be applied for responding to requests to perform directory enumeration file system operations. The directory enumeration mode checks rules related to the path (directory) that is being accessed. For example, the rules can comprise a rule that checks that the path is not within a set of system directories. The rules can also comprise a rule that checks whether the path is in fact a path and not a file. If these rules are satisfied, then the directory enumeration operation can be allowed. In other implementations, additional or other rules are applied when using the directory enumeration mode.

In some implementations, when the directory enumeration file system operation is allowed the file broker service creates a file system cursor that it uses to track the current directory. The file broker service can return a handle to the file system cursor to the application, which the application can then use when making subsequent directory and/or file requests. The file broker service can also return one or more subdirectories within the current directory to the application.

A file enumeration mode can be applied for responding to requests to perform file enumeration file system operations. With the file enumeration mode, the file broker service checks that the path is not within a set of system directories. The file broker service then creates a file system cursor which retrieves all of the child files of the requested directory. The file broker service then filters the child files and returns file information (e.g., file meta-data) to the requesting application for only those files that are of a file type registered by the requesting application.

In some implementations, the file broker service returns a handle to an enumeration cursor that is maintained at the file broker service. The third-party application receives the handle and uses it when performing operations to enumerate the files (e.g., a "get next file" operation). For example, when the file broker service receives a "get next file" enumeration operation, the file broker service uses the enumeration cursor to move to the next file that satisfies the rules (e.g., the next file that is of a file type registered by the third-party application).

In some implementations, information can be cached at an API for more efficient access by the third-party application. For example, when performing a file enumeration operation, meta-data for matching files (e.g., files that have been filtered based on file type) can be provided to the application-side API so that the third-party application can access the matching file information directly from the application-side API without the request having to be sent to the file broker service.

A file access mode can be applied for responding to requests to perform file access file system operations. With the file access mode, the file broker service checks that the path is not within a set of system directories. The file broker service then creates a file sharing token which grants read capabilities for the file to the third-party application. The file sharing token can be subsequently used by the application (e.g., converted to a file handle) to read the file (e.g., using a file sharing service of the operating system) or to copy the file (e.g., copy the file to isolated storage for the application).

In a specific implementation, the file broker service returns a file sharing token to the third-party application. The file sharing token, which can be called an opaque handle, encapsulates meta-data describing the file to be accessed as well as access permissions (e.g., indicating that the third-part application has permission to access the file on the removable storage device). The third-party application can then use the file sharing token to open and read the file. For example, the third-party application can redeem the file sharing token for a file handle, which can be a copy of an original file handled opened within the file broker service. As a security measure, the file sharing token can only be used by the specific third-party application. As another security measure, only the file broker service (and not the third-party application) is permitted to create the file handle and open the file on the removable storage device, which the file broker service then duplicates and provides to the third-party application.

In a specific implementation, the third-party application cannot write to files on the removable storage device. If the third-party application wants to write to a file, the third-party application can first copy the file to isolated internal storage, and write to the file located on the isolated internal storage.

As an initial check for any of the modes described above, the file broker service can check a security capability of the application. For example, the application can declare the capability of accessing files on a removable storage device (e.g., as a parameter in its manifest). This capability can be disclosed to users (e.g., within an application store). Applications that have declared the capability of accessing files on a removable storage device can be allowed to submit requests to perform file system operations. Conversely, applications that have not declared the capability of accessing files on a removable storage device can be prevented from submitting requests to perform file system operations.

Example 8

Computing Systems

Figure 6:
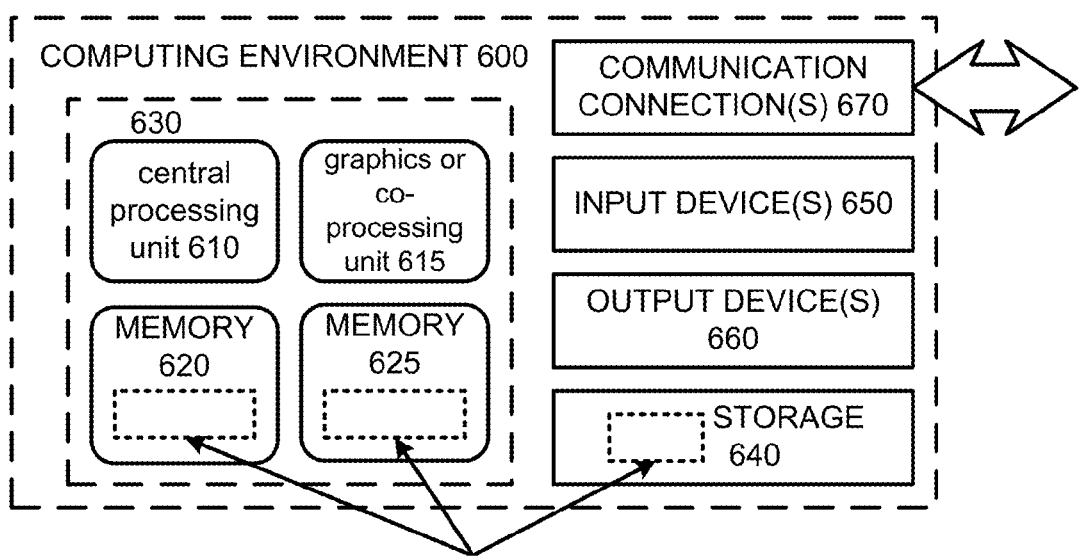
FIG. 6 is a diagram of an exemplary computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9

Mobile Device

Figure 7:
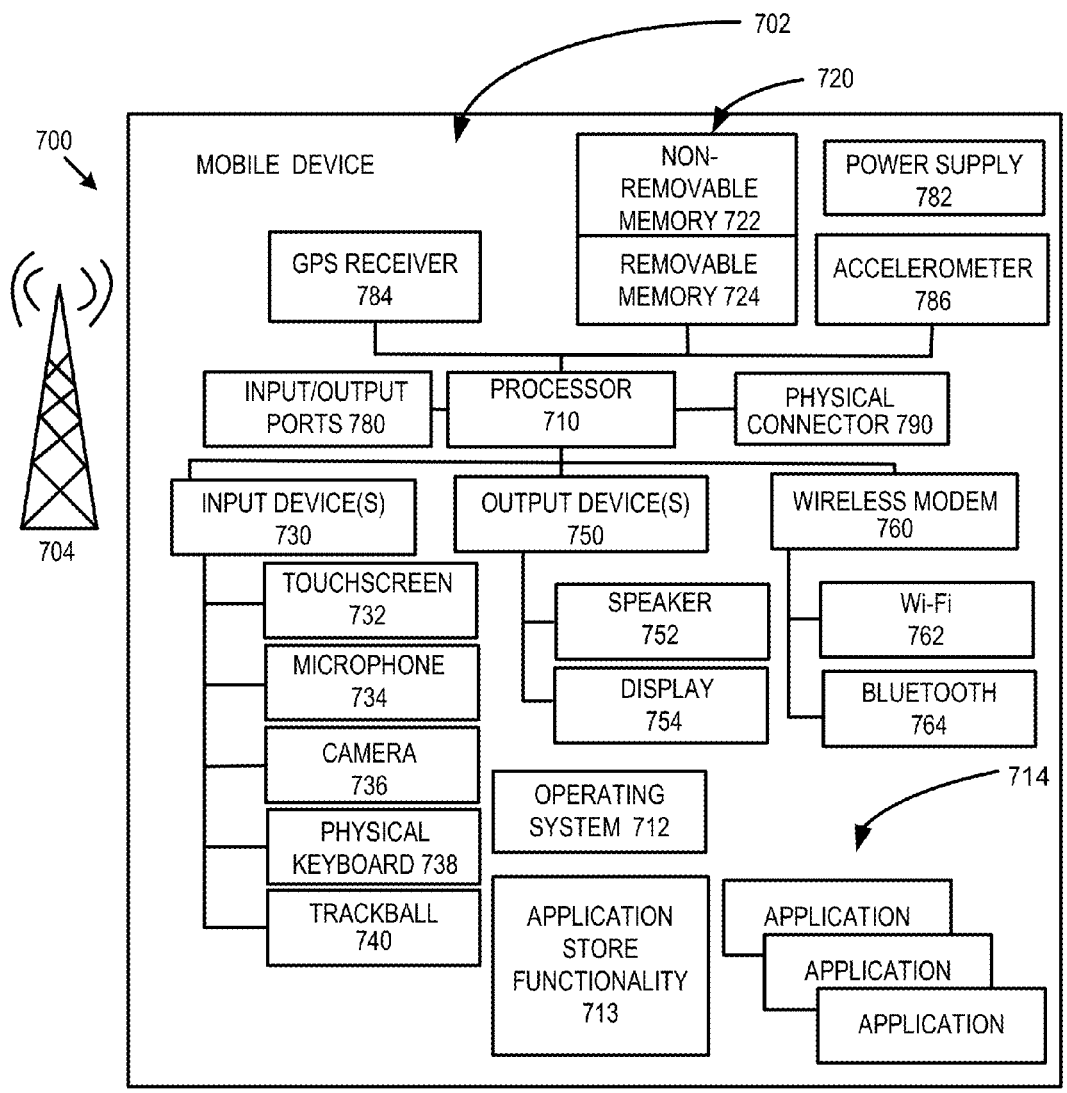
FIG. 7 is an exemplary mobile device that can be used in conjunction with the technologies described herein.

FIG. 7 is a system diagram depicting an exemplary mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular, satellite, or other network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications), or any other computing application. Functionality 713 for accessing an application store can also be used for acquiring and updating application programs 714.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

The input devices 730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 can comprise speech-recognition software as part of a voice user interface that allows a user to operate the device 700 via voice commands. Further, the device 700 can comprise input devices and software that allows for user interaction via a user's spatial gestures, such as detecting and interpreting gestures to provide input to a gaming application.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be deleted and other components can be added.

Example 10

Cloud-Supported Environment

Figure 8:
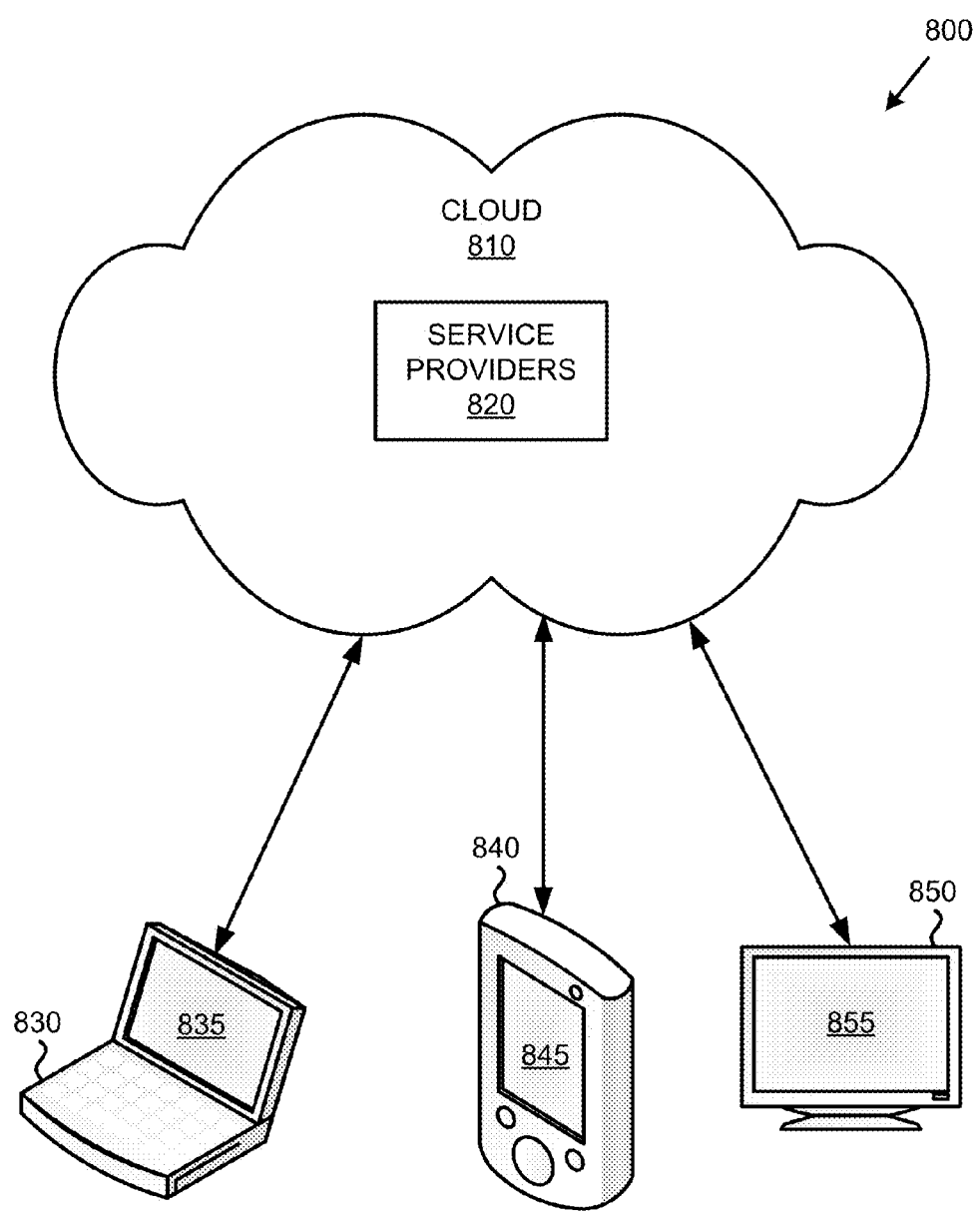
FIG. 8 is an exemplary cloud-support environment that can be used in conjunction with the technologies described herein.

FIG. 8 illustrates a generalized example of a suitable implementation environment 800 in which described embodiments, techniques, and technologies may be implemented. In the example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touch screen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Example 11

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. By way of example and with reference to FIG. 7, computer-readable storage media include memory and storage 720, 722, and 724. The term computer-readable storage media does not include communication connections (e.g., 670, 760, 762, and 764) such as signals and carrier waves.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method, implemented at least in part by a computing device, for rule-based access to removable storage devices, the method comprising:

receiving, by a service of the computing device, a request to perform a file system operation using a removable storage device of the computing device, wherein the removable storage device is formatted with a file system that does not support access controls, and wherein the request to perform the file system operation is received from a third-party application running on the computing device;

performing, by the service of the computing device, a rules-based check of the received request, wherein the rules-based check comprises checking the received request against a plurality of rules, wherein the rules-based check is performed independent of the file system of the removable storage device, and wherein the performing the rules-based check of the received request comprises:

checking a rule, of the plurality of rules, that limits access to one or more file types registered by the third-party application;

determining, by the service of the computing device, whether to allow the request to perform the file system operation based on results of the rules-based check; and when the request to perform the file system operation is allowed, performing the file system operation.

2. The method of claim 1 wherein the service of the computing device runs within an operating system security context, and wherein the third-party application runs within an application security context.

3. The method of claim 2 wherein the request to perform the file system operation is received by a service-side application programming interface (service-side API) of the service from an application-side application programming interface (application-side API), wherein the service-side API is located within the operating system security context, wherein the application-side API is located within the application security context, and wherein the application-side API is independent of the third-party application.

4. The method of claim 1 wherein the third-party application is a downloadable application from an online application store.

5. The method of claim 1 wherein the performing the rules-based check of the received request comprises:
checking a rule, of the plurality of rules, that prevents access to one or more system folders stored on the removable storage device.

6. The method of claim 1 wherein the file system operation is one of a directory enumeration operation, a file enumeration operation, and a file access operation.

7. The method of claim 1 wherein the plurality of rules comprise:
one or more rules for validating file system paths;
one or more rules for filtering file types; and
one or more rules for validating security capabilities.

8. The method of claim 1 wherein the removable storage device is formatted with a File Allocation Table (FAT) file system.

9. The method of claim 1 wherein the removable storage device of the computing device is one of a Secure Digital (SD) storage card and a MultiMediaCard (MMC) storage card.

10. The method of claim 1 further comprising:
receiving a second file system operation using the removable storage device of the computing device, wherein the second file system operation is a file enumeration operation for filtering files in a directory identified by the second file system operation; and
performing a second rules-based check for the received second file system operation, wherein the second rules-based check comprises:
checking one or more rules, of the plurality of rules, that filters the one or more file types registered by the third-party application; and
returning filtered files in the directory that are of the one or more file types.

11. A computing device comprising:
a processing unit;
memory; and
a removable storage device, wherein the removable storage device is formatted with a file system that does not support access controls;
the computing device configured to perform operations for rule-based access to the removable storage device, the operations comprising:

receiving, by a file broker service of the computing device from a third-party application running on the computing device, a request to perform a file system operation using the removable storage device;

performing, by the file broker service of the computing device, a rules-based check of the received request, wherein the rules-based check comprises checking the received request against a plurality of rules, wherein the rules-based check is performed independent of the file system of the removable storage device, and wherein the performing the rules-based check of the received request comprises:
checking a rule, of the plurality of rules, that limits access to one or more file types registered by the third-party application; and
when the rules-based check indicates that the plurality of rules are satisfied, performing the file system operation.

12. The computing device of claim 11, the operations further comprising:
when the rules-based check indicates that any of the plurality of rules is not satisfied, denying the file system operation.

13. The computing device of claim 11, the operations further comprising:
returning a result of the performing the file system operation to the third-party application.

14. The computing device of claim 11 wherein the third-party application has registered to handle the one or more file types, wherein the file system operation is a file enumeration operation, and wherein the performing the rules-based check of the received request comprises:
checking a rule, of the plurality of rules, that filters files in a directory based on the one or more registered file types.

15. The computing device of claim 11 wherein the file broker service runs within an operating system security context, wherein the third-party application runs within an application security context, wherein the request to perform the file system operation is received by a service-side application programming interface (service-side API) of the file broker service from an application-side application programming interface (application-side API), wherein the service-side API is located within the operating system security context, wherein the application-side API is located within the application security context, and wherein the application-side API is independent of the third-party application.

16. The computing device of claim 11 wherein the performing the rules-based check of the received request comprises:
checking a rule, of the plurality of rules, that prevents access to one or more system folders stored on the removable storage device.

17. The computing device of claim 11 wherein the removable storage device is formatted with a File Allocation Table (FAT) file system, and wherein the removable storage device of the computing device is one of a Secure Digital (SD) storage card and a MultiMediaCard (MMC) storage card.

18. A computer-readable memory or storage device storing computer-executable instructions for causing a computing device to perform a method for rule-based access to removable storage devices, the method comprising:
receiving, from a third-party application running on the computing device, a request to perform a file system operation using a removable storage device of the computing device, wherein the removable storage device is formatted with a file system that does not support access controls, and wherein the first system is a File Allocation Table (FAT) file system;

performing a rules-based check of the received request, wherein the rules-based check comprises checking the received request against a plurality of rules, wherein the rules-based check is performed independent of the file system of the removable storage device, and wherein the performing the rules-based check of the received request comprises:

checking a rule, of the plurality of rules, that limits access to one or more file types registered by the third-party application;

determining whether to allow the request to perform the file system operation based on results of the rules-based check; and when the request to perform the file system operation is allowed, performing the file system operation;

wherein the method is performed by a file broker service of the computing device, wherein the file broker service of the computing device runs within an operating system security context, and wherein the third-party application runs within an application security context.

19. The computer-readable memory or storage device of claim 18 wherein the plurality of rules comprise:

one or more rules for validating file system paths;
one or more rules for filtering file types; and
one or more rules for validating security capabilities.

\* \* \* \* \*